United States Patent
Mckiel, Jr.

(10) Patent No.: US 9,697,745 B2
(45) Date of Patent: Jul. 4, 2017

(54) AUXILIARY SENSOR FOR TOUCHSCREEN DEVICE

(71) Applicant: VERIZON PATENT AND LICENSING INC., Basking Ridge, NJ (US)

(72) Inventor: Frank A. Mckiel, Jr., Colorado Springs, CO (US)

(73) Assignee: Verizon Patent and Licensng Inc., Basking Ridge, NJ (US)

( * ) Notice: Subject to any disclaimer, the term of this patent is extended or adjusted under 35 U.S.C. 154(b) by 362 days.

(21) Appl. No.: 13/837,715

(22) Filed: Mar. 15, 2013

(65) Prior Publication Data

US 2014/0267170 A1    Sep. 18, 2014

(51) Int. Cl.
| | |
|---|---|
| *G06F 3/01* | (2006.01) |
| *G06F 3/041* | (2006.01) |
| *G06F 3/042* | (2006.01) |
| *G09B 21/00* | (2006.01) |
| *G06F 3/0488* | (2013.01) |

(52) U.S. Cl.
CPC .......... *G09B 21/001* (2013.01); *G06F 3/0488* (2013.01)

(58) Field of Classification Search
CPC ...... G06F 3/042; G06F 3/0421; G06F 3/0428; G06F 3/023; G06F 3/033; G06F 3/0423; G06F 3/0425; G06F 3/0202
See application file for complete search history.

(56) References Cited

U.S. PATENT DOCUMENTS

| | | | | |
|---|---|---|---|---|
| 5,698,845 | A * | 12/1997 | Kodama et al. | 250/221 |
| 8,416,217 | B1 * | 4/2013 | Eriksson | G06F 3/0421 |
| | | | | 178/18.09 |
| 2001/0055006 | A1 * | 12/2001 | Sano | G06F 3/0423 |
| | | | | 345/175 |
| 2005/0230605 | A1 * | 10/2005 | Pishdadian | G01L 9/0076 |
| | | | | 250/221 |
| 2008/0225006 | A1 * | 9/2008 | Ennadi | 345/171 |
| 2010/0085329 | A1 * | 4/2010 | Tseng | G06F 3/0421 |
| | | | | 345/175 |
| 2010/0207909 | A1 * | 8/2010 | Wu et al. | 345/175 |
| 2010/0207912 | A1 * | 8/2010 | Wu | G06F 3/0428 |
| | | | | 345/175 |
| 2010/0222110 | A1 * | 9/2010 | Kim | G06F 1/1616 |
| | | | | 455/566 |
| 2010/0328420 | A1 * | 12/2010 | Roman | 348/14.08 |
| 2011/0122091 | A1 * | 5/2011 | King et al. | 345/175 |
| 2011/0207405 | A1 * | 8/2011 | Minemura et al. | 455/41.2 |
| 2012/0050226 | A1 * | 3/2012 | Kato | 345/175 |
| 2014/0200054 | A1 * | 7/2014 | Fraden | 455/575.8 |

* cited by examiner

*Primary Examiner* — Ilana Spar
*Assistant Examiner* — Nguyen H Truong

(57) ABSTRACT

Exemplary embodiments are described wherein an auxiliary sensor is removably attached to a touchscreen computing device and is communicably coupled to the device to provide additional user input to the computing device. In accordance with some embodiments, the additional user input may be used to affect how the computing device interprets and processes gestural user input from the touchscreen, or to simulate such input. In accordance with an illustrative embodiment, the auxiliary sensor establishes an optical path near the surface of the touchscreen and sensing user contact by observing blockage of the optical path by a user's pointing member.

20 Claims, 11 Drawing Sheets

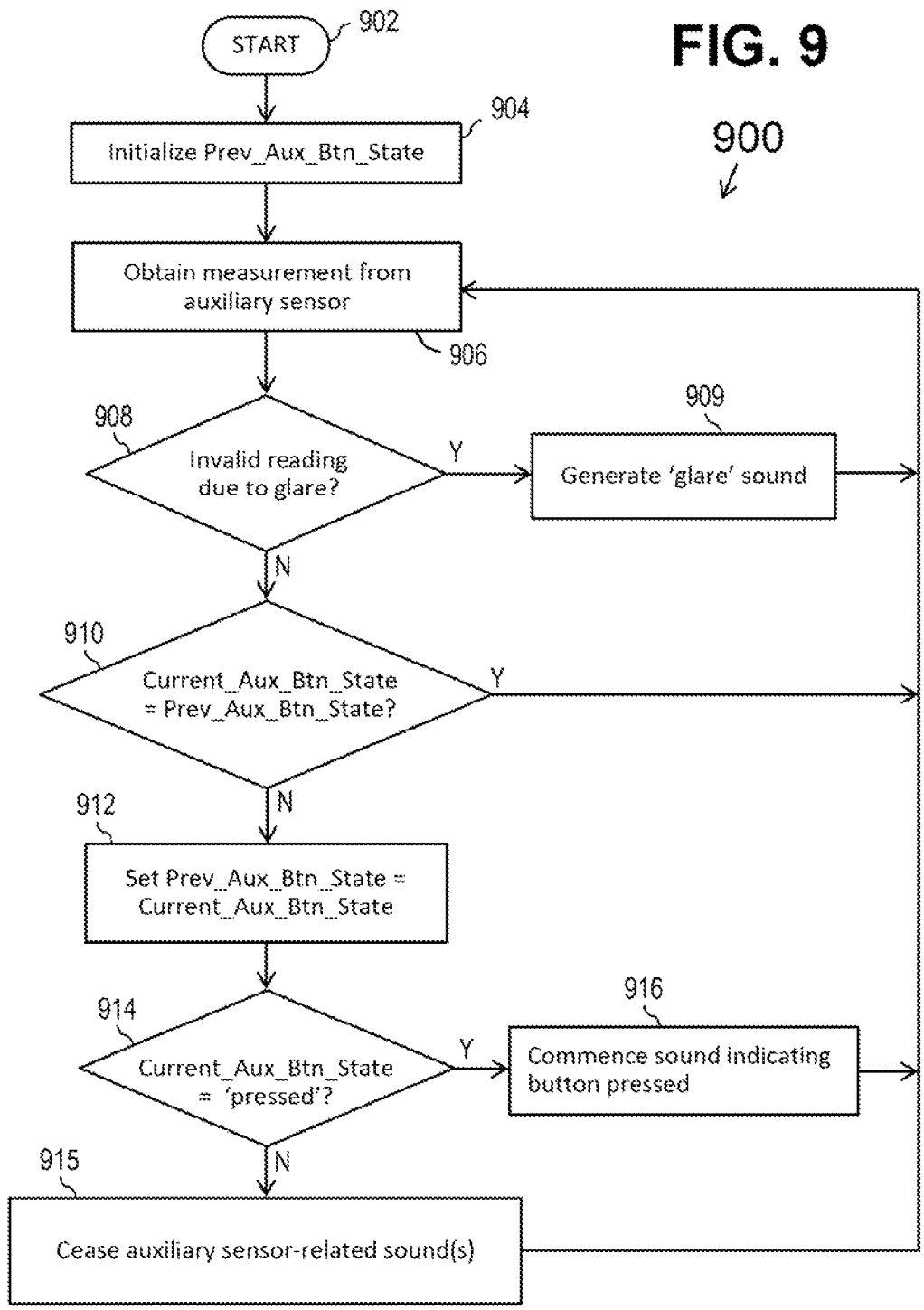

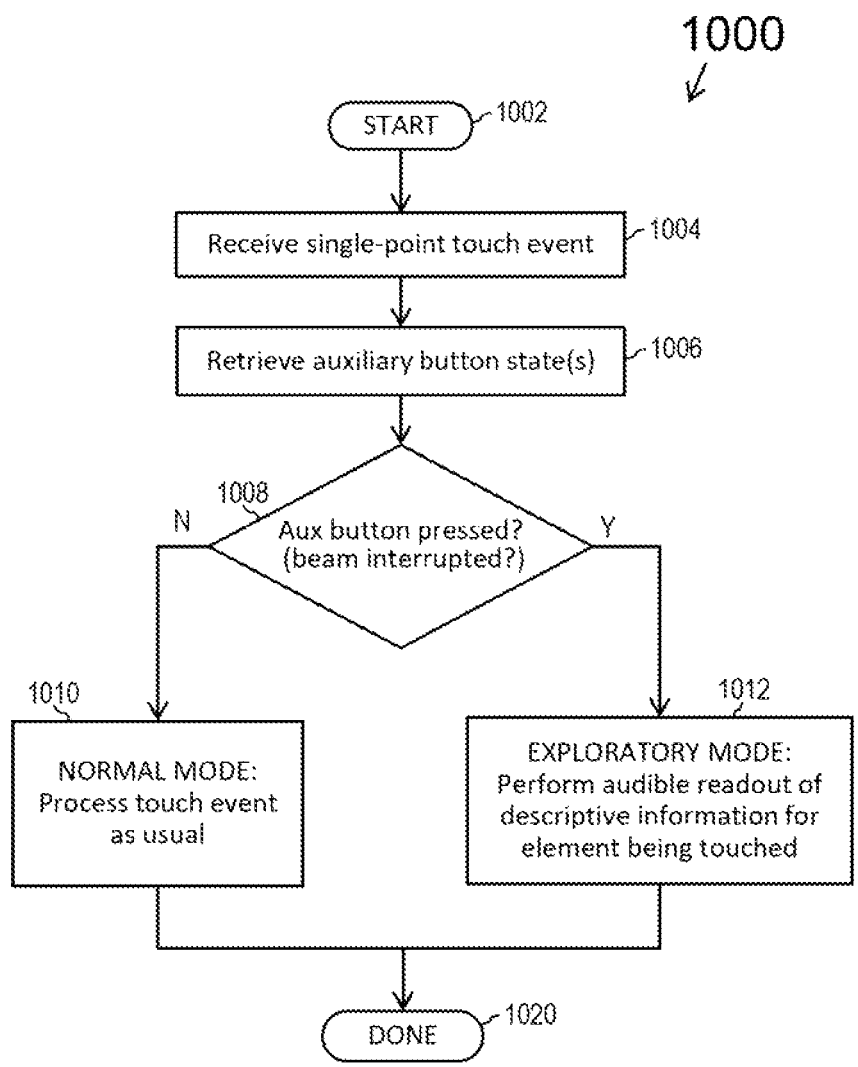

AUXILIARY SENSOR FOR TOUCHSCREEN DEVICE

BACKGROUND INFORMATION

In recent years, mobile communication and computing devices using touch-sensitive displays, such as the 'iPhone'™ from Apple Inc., have become commonplace. Users are typically able to directly manipulate graphically-depicted interactive elements on the user interface display by placing one or more fingertips in contact with the screen and making gestures such as tapping, sliding and pinching. Touchscreens typically comprise transparent, capacitance-sensing layers and, using well-known techniques, can sense the position of multiple simultaneous points of contact between a users fingers and the display surface. In terms of interaction with graphical interface elements, users can simulate typing on a displayed keyboard, select icons to open applications, select text fields for subsequent textual input and scroll through lists or other contents. With many such devices, users may even scroll an entire 'home screen' or 'desktop' that displays an array of icons that each represent an application to launch or a feature to invoke.

Touchscreen devices like the iPhone rely mainly upon the visual display and touchscreen to support user interaction and tend to provide minimal physical buttons or other input mechanisms for which a user could employ tactile sense to locate and actuate. This minimization of mechanical buttons makes for a heavily software-driven and graphically-oriented user interface that supports fingertip gestures. While this lends to versatility of the device, there is a practical limit on the number of gestures that are intuitive, easily remembered and readily distinguishable. As the possible gestures are dedicated to specific interactions, the gesture mappings become quickly exhausted. This is especially true when accessibility tools are layered on top of normally used touchscreen paradigms. Furthermore, where nearly every user interaction must take place via the touchscreen, a user who wants to freely alter some functional attribute of the device or an application must navigate through a menu hierarchy to reach a particular setting and is thus impeded from making momentary or dynamic changes to certain settings.

Vision-impaired users of such touchscreen devices may be unable to see user interface elements displayed on the screen, such as simulated keyboard keys, icons, buttons and the like. However, some accommodations have been introduced, such as Apple's 'VoiceOver' accessibility feature, so that sound effects or synthesized speech inform a vision-impaired user of content or controls that correspond to the position of the user's finger as they touch the screen. To support this, application developers add descriptive textual labels in their application's interfaces so that, ideally, each visual page or control element also has a corresponding textual description that can be announced to a user by speech synthesis. Consequently, even without seeing the displayed elements, a user can probe the display and elicit audible responses until finding a desired function or control or content.

In addition to having applications provide descriptive labels for the displayed elements, additional measures have been instituted to distinguish between a single-point touching gesture used by a blind user to explore the display and a similar single-touch that would normally signify intent to launch an application or act upon a control element, such as a displayed pushbutton control. As an example of this disambiguation, Apple's VoiceOver accessibility mode notably shifts the interpretation of touchscreen gestures.

When the 'VoiceOver mode' is active, the user's single-fingered input is assumed to be an attempt to only probe the environment and elicit descriptive sounds. Without this provision, a blind users attempt to merely explore the displayed icons could not be distinguished from an intent to invoke an application or otherwise act upon touchscreen-actuated visual elements.

In order for a user, during VoiceOver mode, to actually take action upon an element in the same way a single-tap gesture would normally work, the user must instead perform a 'double-tap', or in some instances a 'triple-tap'. In other words, the user typically performs a preparatory exploration of the interface by touching the screen in various locations and hearing descriptive sounds for elements displayed under their fingertips. As various elements are contacted, a VoiceOver 'cursor' is shifted around to highlight the currently or most recently contacted element for which a sound was elicited. Once the VoiceOver cursor has been used to select a user interface element, the user may subsequently execute a double-tap gesture anywhere on the screen to activate the selected control. The double-tap gesture anywhere on the screen will perform the same action that a single-tap directed at the selected element would have performed if VoiceOver mode were not active. Thus, with VoiceOver mode active, single-touch gestures effectively become intercepted and used for exploratory interaction whereas double-tap gestures are, in effect, converted to single-tap gestures as if executed upon the element that is currently highlighted.

The VoiceOver mode also entails modification of other user inputs via the touchscreen. A scrolling action, typically performed by a single finger sliding in a scroll direction, also has to be disambiguated from the motion of simply sliding around to find displayed features without activating them. Accordingly, while in VoiceOver mode, scrolling is only engaged when three fingers come into contact with the screen. (Two-fingered gestures are already assigned to controlling page-wise reading).

While the above measures improve basic accessibility of touchscreen interfaces to blind or low-vision users, further improvements may be realized in terms of agility, ease of use, efficient use of available gesture combinations or in facilitating a common experience to be shared among both sighted and vision-impaired users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 9 is a flowchart depicting an example generalized process, in accordance with principles described herein, that may be used in conjunction with an external sensing device to detect whether or not a user is actuating the external sensing device and to make that information available to software processes.

FIG. 10 is a flowchart describing an example of a process by which an operating system or application therein may receive, process, and act upon an indication from an external sensing device to affect the functioning of said operating system or application in accordance with principles described herein.

DETAILED DESCRIPTION OF PREFERRED EMBODIMENTS

Figure 1:
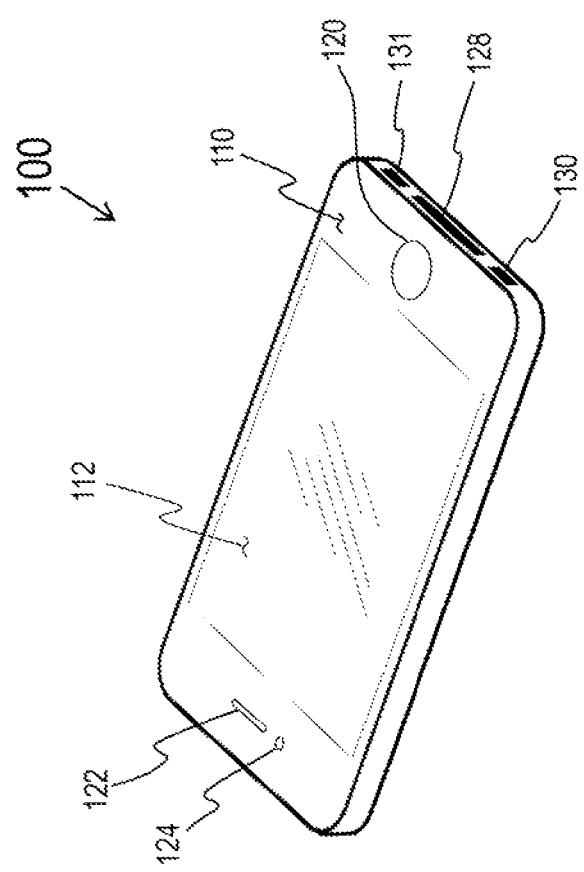
FIG. 1 is a diagram of a typical mobile computing device having a touchscreen surface/display.

FIG. 1 shows a typical mobile computing device 100 (which may also be referred to as a 'host device' or 'touchscreen device') as but one suitable example device to which the presently described principles may be usefully applied. Device 100 may be, for example, an IPhone™ manufactured by Apple Inc, Mobile computing device 100 comprises a smooth, glasslike front surface 110, a portion of which is a touch-sensitive region (or simply 'touchscreen') 112 overlaying a visual display. In other words, touchscreen 112 corresponds to an area of front surface 110 that is not only a visual display but is also sensitive to contact by a user's fingertip, or other members that exhibit the capacitance, electrical conductivity or other electrical/mechanical characteristics that the touchscreen uses to sense a user's fingertip.

It should be noted from this diagram that there are some portions of front surface 110 that are not part of the touch-sensing region 112. Along those portions outside of the touch-sensitive region 112 are placed, for example, a physical pushbutton 120, a sound output portal 122, and a front facing camera portal 124. Mobile computing device 100 also typically has other pushbuttons protruding slightly along the outer perimeter of the device but are not shown here for simplicity. These other pushbuttons include an on-off switch, a silencing switch, and a volume control pushbuttons.

Mobile computing device 100 is shown to also have an electrical connector port 128 through which several types of connections may be made. These connections include those for providing charging current to device 100, powering of external devices from the mobile computing device's battery, connections to analog audio devices, and data connections for transferring data to and from the device. Additional sound portals 130, 131 are shown to be located alongside the connector 128. These sound portals may be coupled to an internal speaker for sound output or to a microphone for sound input, such as when the mobile computing device is used as a mobile telephone or sound recorder.

Figure 2A:
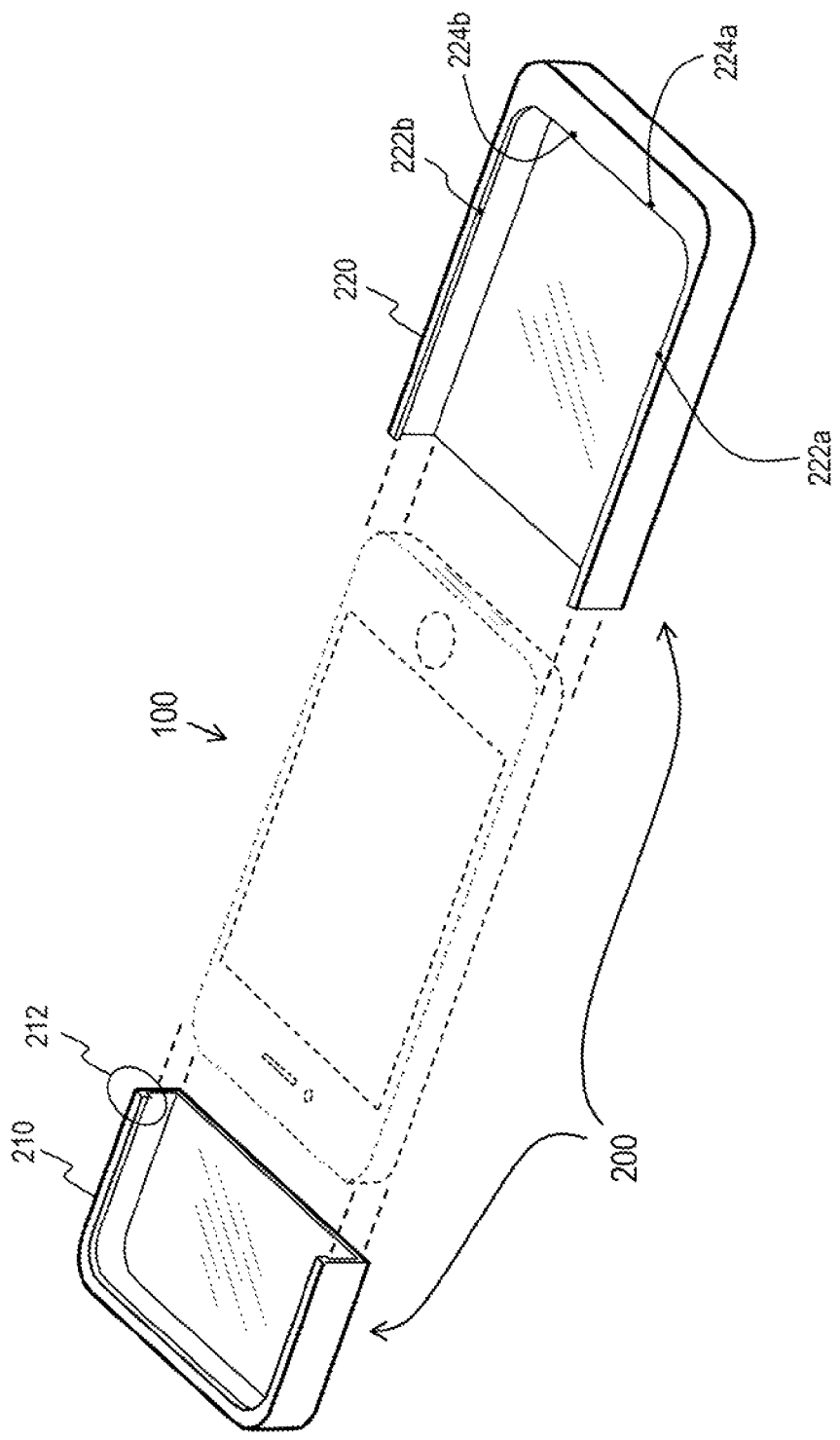
FIG. 2A is a pictorial showing an outer shell housing that may encompass a mobile touchscreen device in accordance with an example embodiment that comports with principles described herein.

FIG. 2A is a pictorial diagram showing the manner in which a mobile computing device 100 may be fitted with an outer housing 200 that partially surrounds device 100. One variation is shown wherein outer housing 200 comprises top half 210 in the bottom half 220 which both comprise recesses to just fit snugly onto the computing device and slide together until joined.

One such commercially available housing that works in this manner is an external battery attachment for the iPhone called the 'Juice Pack' from Mophie, Inc. Note that each housing half comprises a slight lip 212 to hold the mobile device within the housing. In the commercially available Mophie brand product, these two housing halves slide together and have are held towards one another by interlocking tabs which, for clarity, are not explicitly shown in this diagram. Furthermore, housing 200 may encompass additional openings on some surfaces to provide access to other controls and devices on the surface of the device 100, such as switches and cameras, which are not shown here. In accordance with an illustrative embodiment consistent with principles described herein, light-emitting elements 222a and 222b are shown to be inset along the lip of lower housing half 220, along with some light-receiving elements 224a and 224b.

Figure 2B:
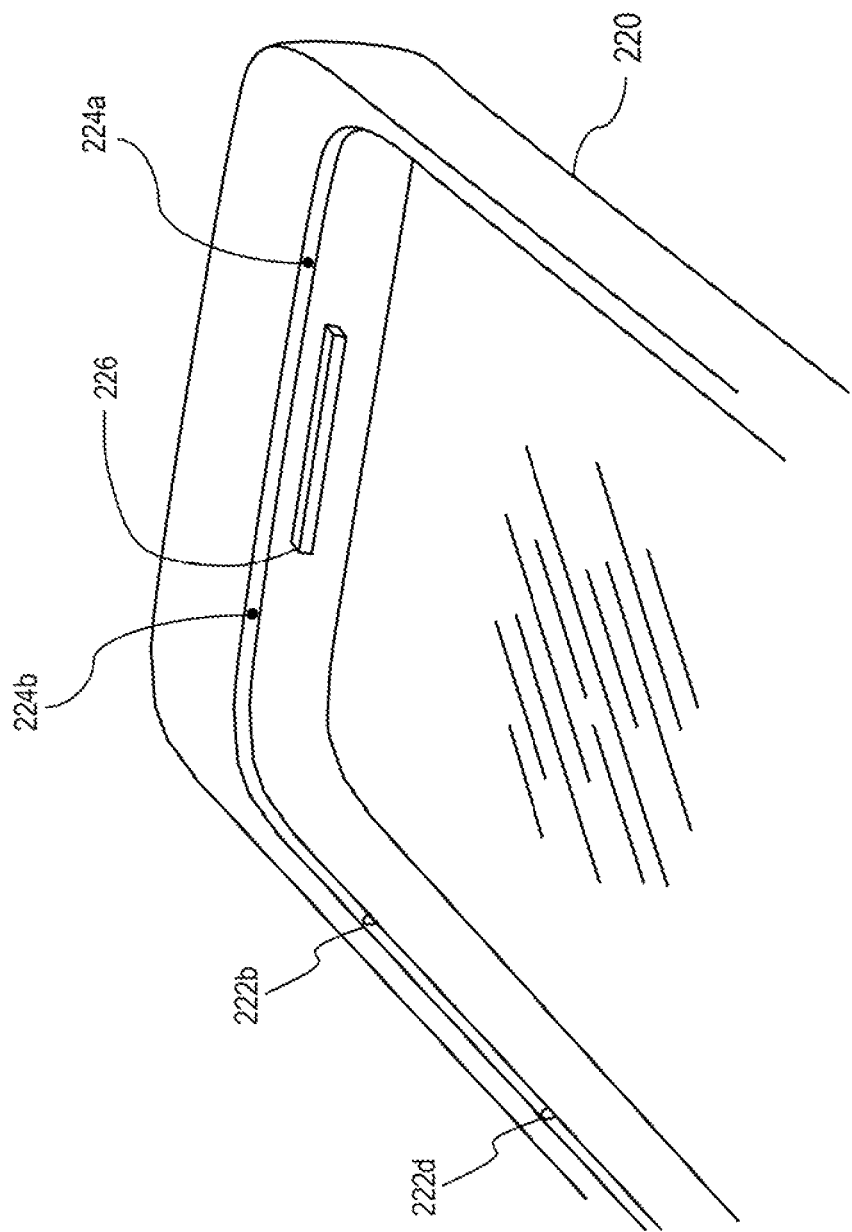
FIG. 2B is a close-up view of part of an outer shell housing depicting the location of light-emitting and light-receiving elements in accordance with an exemplary embodiment that comports with principles described herein.

FIG. 2B shows a close-up view of a lower housing half 220 again depicting possible locations for light-emitting elements such as 222b and 222d as well as light sensing elements 224a and 224b. FIG. 2B also shows the presence of an electrical connector 226 being set back within the recess of lower housing have to learn 20 such that when mobile computing device 100 is inserted as was shown in FIG. 2A, this electrical connector mates with the electrical connector 128 of the mobile computing device. As will be explained further below, this connection may be used to provide power to external sensing circuitry and to communicate to the mobile computing device state information generated by an external sensing device.

In alternative embodiments, housing 200 may comprise a single, flexible structure (created using well known processes) containing the components described herein. In such a case, the housing may be designed to allow for stretching in certain areas to allow a mobile computing device 100 to be inserted into the housing 200 in a manner causing a snug fit for secure attachment. Other embodiments may use a housing 200 that is a single, rigid structure containing the components described herein, but with a top portion that is open or openable (such as by a hinging area), such that a mobile computing device 100 may be slid into the housing 200 from the top portion in a manner causing a snug fit for secure attachment.

Figure 3A:
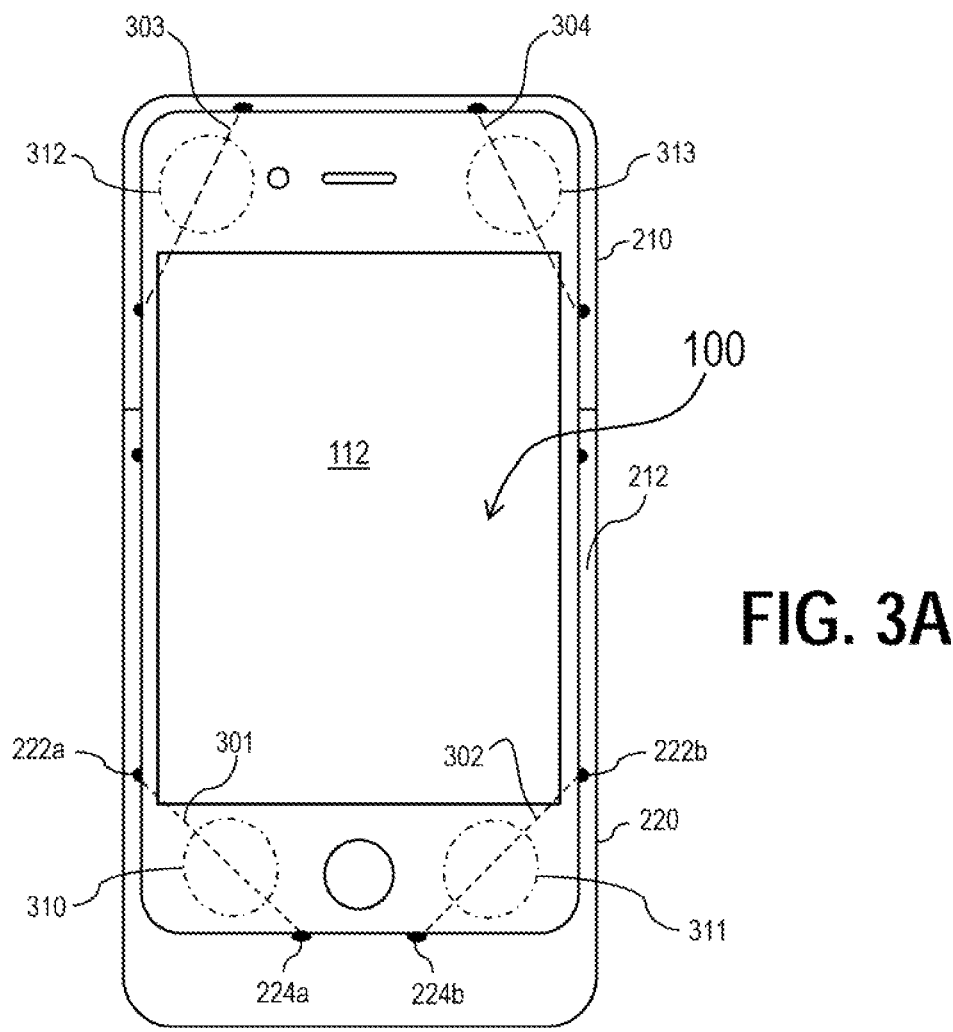
FIGS. 3A-3B show a front view of a mobile computing device encased within an outer shell housing and further depict example light paths between light-emitting and light sensing elements disposed within the outer shell housing.

FIG. 3A shows a front view of a mobile computing device 100 to which housing 200 has been applied and secured. The lip or bezel 212 of the housing can be seen to surround the front of the mobile computing device surface preferably without significantly encroaching on the surface or impeding a user's ability to view or touch the surface. It is evident that the exemplary lower housing half 220 and the exemplary upper housing half 210 have been slid together to encapsulate device 100.

FIG. 3A also shows, using dotted line 301, a pathway for light across the just above the surface of the mobile computing device between a light-emitting element 222*a* and a light-receiving element 224*a*. For example, as disposed along the edges of the bezel of lower housing half 220, as shown, paths for light between emitter-receiver pairs are shown to traverse an area that is outside of touchscreen region 112. Additionally, other dotted lines 302, 303, 304 indicate other potential locations for light paths between properly situated pairs of light emitters 222 and light receivers 224 along bezel 212.

For reference, FIG. 3A also depicts the outline of several example regions (310-313) of the surface of mobile computing device 100 that are typically non-touch-sensitive but which, by virtue of optical paths 301-304, are usefully rendered so in accordance with principles described herein.

Figure 3B:
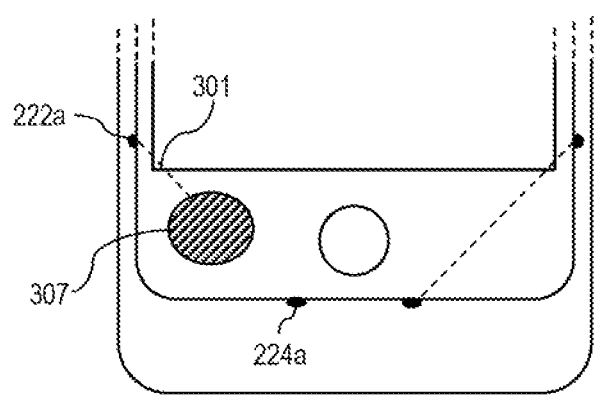

FIG. 3B is a pictorial showing a portion of FIG. 3A and further depicting the situation in which a pointing member 307, such as a user's fingertip or thumb, is interposed between a light-emitting element 222 and a light-receiving element 224 so as to interrupt light path 301. As will be described below, this situation that illustrative embodiments detect.

Figure 4:
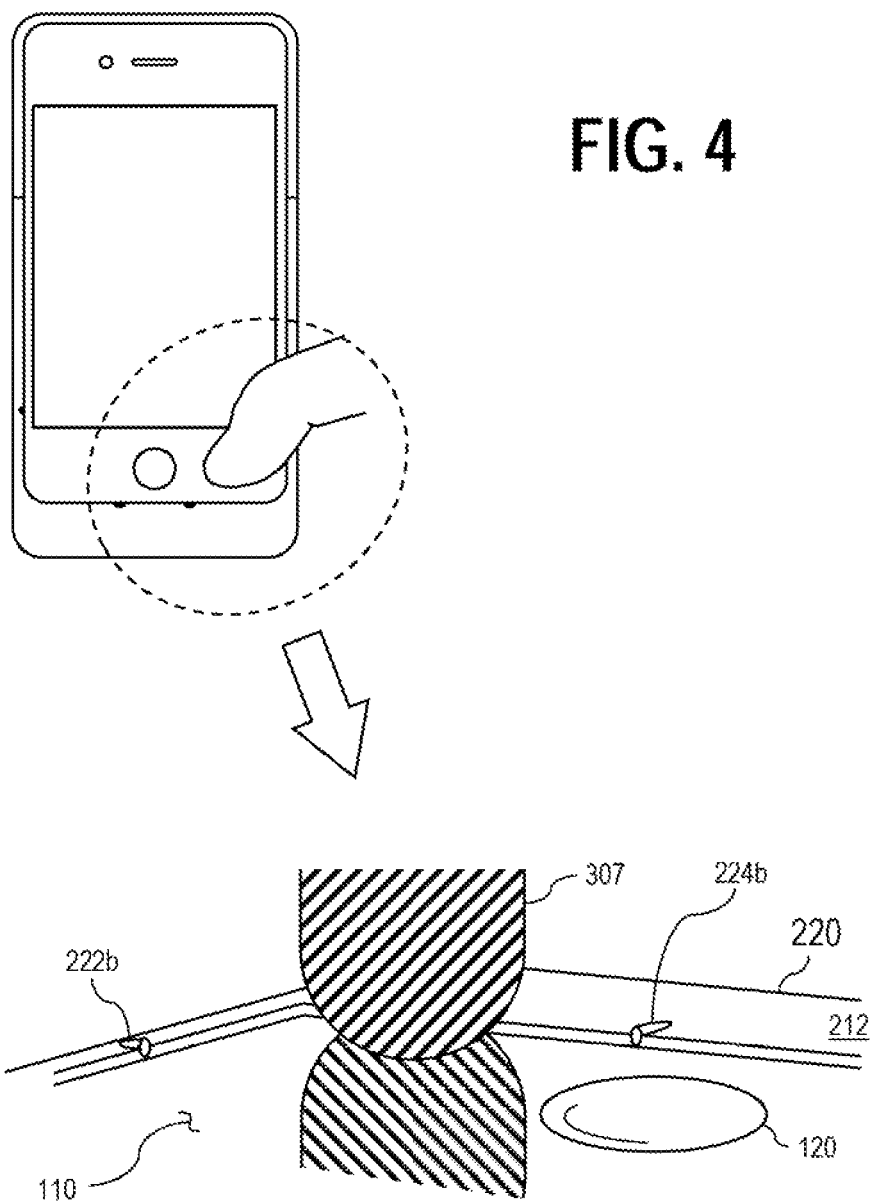
FIG. 4 is a pictorial diagram depicting the manner in which a pointing member coming into contact with the surface of the mobile computing device may block the path of a light beam between light-emitting elements and light sensing elements.

FIG. 4 is a pictorial showing a close-up of how one corner of the mobile computing device surface might appear if a housing with external sensing features is in place around the device and when a user's finger (pointing member 307) approaches or makes contact with the surface 110 of the mobile computing device. For orientation, it is useful to note the presence of physical button 120 and the widened bottom bezel portion 212 of lower housing half 220. Light-emitting element 222*b* and light-receiving element 224*b* are shown as slightly raised features along the bezel 212, although it may be appreciated that the lip 212 could be formed with sufficient depth such that no further outcroppings of the housing would be necessary to house the optical elements. However, it is considered that such slight humps, outcroppings or protrusions formed in a molded housing may even be advantageous for giving a user a sense of, for example, where the bottom edge of the touchscreen 112 ends. That is, the hump for light-emitting element 222*b* may be designed to align directly with the bottom boundary of touchscreen region 112 when lower housing 220 is slid all the way on to mobile computing device 100.

Figure 5:
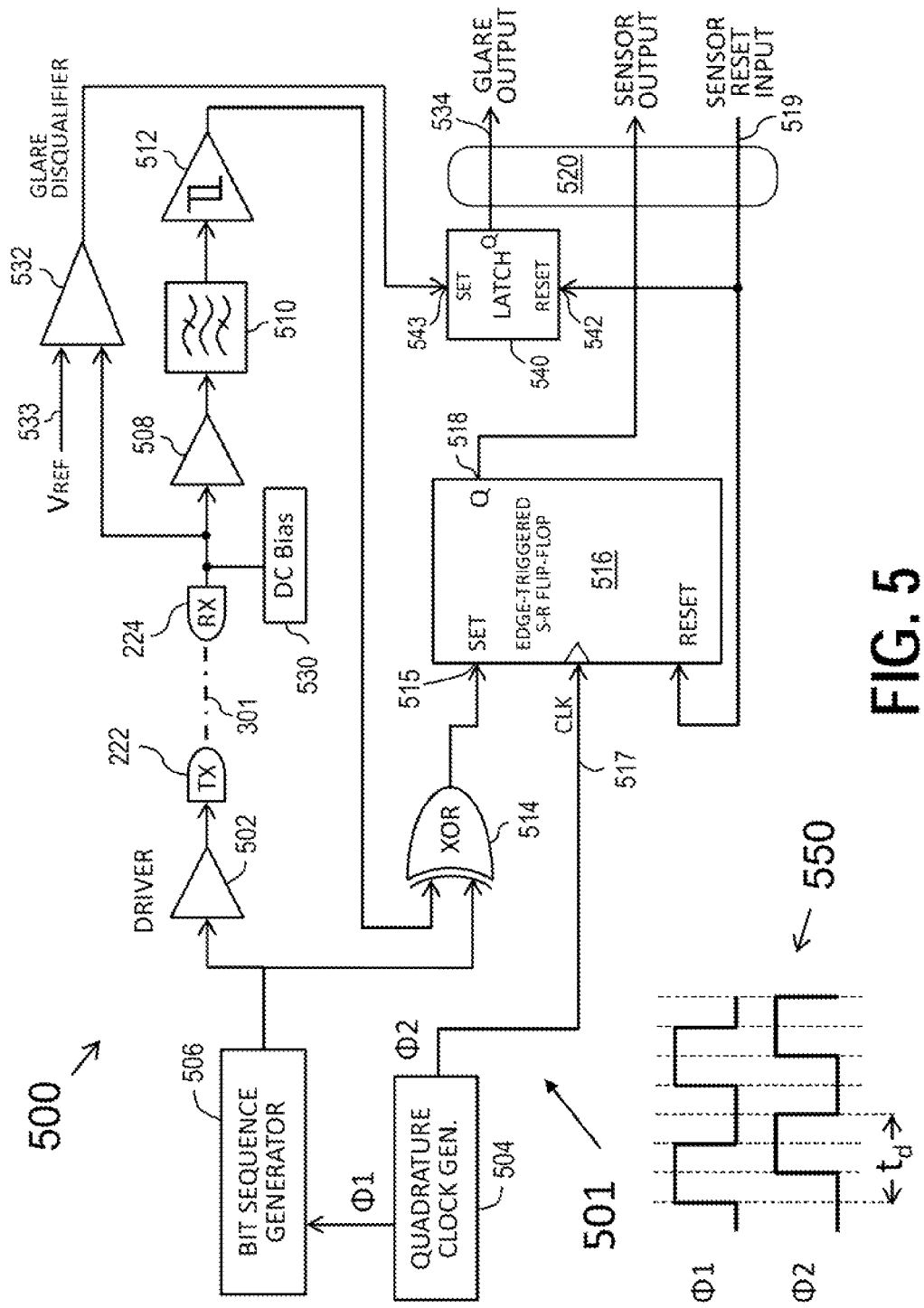
FIG. 5 is a block diagram describing an electronic circuit, in accordance with an example embodying principles described herein, to detect a blockage of the light path between a light-emitting element and a light sensing element.

FIG. 5 depicts an illustrative example of a system 500 to ascertain whether a light path between the light-emitting elements and light-receiving elements is obscured, as might be the case when a user touches the surface of the mobile computing device 100 in regions such as 310, 311 shown earlier. In the example arrangement shown in FIG. 5, the system creates a unique pattern of modulation on the emitted signal that is sensed by the receiving element and which is unlikely to be mimicked by extraneous light sources near the device. This design effectively assures that the light being received corresponds to the light that was transmitted.

As shown in FIG. 5, example system 500 includes a detection controller system 501 connected to a light-emitting element 222 and a light-receiving element 224. Light-emitting element 222 is of a type wherein the amount of light output may be varied or turned on and off based on electrical signals provided by the detection controller system. Light-emitting element 222 may be a light-emitting diode (LED) or a small laser diode. The wavelength output of light-emitting element 222 may be infrared, visible light, or other wavelengths that will propagate over short distances in a line-of-sight fashion similar to an optical wave. Light-receiving element 224 may be a phototransistor, avalanche photodiode, cadmium sulfide photocell or other similarly light-sensitive component, wherein the detection of light (or the absence thereof) generates electrical signals to the detection controller system 501.

Detection controller system 501 may take the form of an electrical circuit that includes various elements to control the operation of light-emitting element 222 and light-receiving element 224. For example, a driver circuit 502 may be used to provide electrical current to drive light-emitting element 222, which may be a power amplifier, transistor, controllable current source or the like as is well known for driving, for example, infrared LED's commonly used in home entertainment remote controls. To generate a time sequence of on-and-off signals which may be used to turn light-emitting element 222 on and off or to vary its light output, a bit sequence generator 506 may be used as driven by a quadrature clock generator 504 operating in a given frequency. It is considered preferable to operate clock generator 504 at some frequency unrelated to the 36 or 38 kHz frequencies which are commonly used for many infrared remote controls in the consumer electronics industry. Bit sequence generator 506 is designed to present at its output a signal that changes upon, for example, the rising edge of each pulse from Phase 1 of the quadrature clock generator. This output from bit sequence generator 506 directly affects the output of light-emitting element 222 through driver 502. Bit sequence generator 506 may be implemented using well-known techniques, such as clocking out preset bits from a read-only memory or using a linear feedback shift register.

The light from light-emitting element 222 traverses optical path 301 to reach light-receiving element 224, which may be, for example, a phototransistor that is biased so that the amount of current passing between its collector and emitter varies in some proportion to the amount of light that it is receiving at any moment. When the light path between the emitter and receiver is unobstructed, fast variations in the light signal received by light-receiving element 224 are expected to correspond to the on-off pattern of the optical signal created by bit sequence generator 506.

Under normal circumstances, the optical signal received at element 224 will exhibit the same clock frequency generated by quadrature clock generator 504. Receive amplifier 508 may be used to amplify the varying electrical signal from the light-receiving element 224. Furthermore, the signal from the receive amplifier for 508 may then be passed through a bandpass filter 510, for which the passband frequency range encompasses at least the clock frequency of the quadrature clock generator 504. The use of bandpass filter 510 is advantageous because the light-receiving element 224, being disposed on the bezel 212 of the housing, is subject to receiving ambient light from a variety of sources and some of these light sources may be modulated at various frequencies, such as multiples of alternating-current power line frequencies (60 Hz the United States) or 36 kHz to 38 kHz (a carrier frequency commonly used for remote control signals for home appliances). Bandpass filter 510 can be used to ensure that system 500 is selective for the modulation imposed upon the optical signal that traverses light path 301.

The signal out of the bandpass filter 510 may then enter a thresholding comparator 512 which determines that any moment whether the signal received by light-receiving element 224 is above or below a given level, corresponding to a logical 'one' bit or 'zero' bit. This comparator may incorporate some hysteresis to improve noise immunity. It should be noted that the circuitry supporting light-emitting element 222 and light-receiving element 224 may accomplish transmission of an optical signal that is modulated with a relatively high subcarrier frequency and then that high-frequency modulation may be gated on and off (or otherwise modulated) to represent logical ones and zeros. In other words, the clock rate at which symbols are expressed in the signal would be considerably lower than the high-frequency modulation. This is similar to the scheme used in infrared remote controls commonly used for household appliances. Of course, if such a modulation scheme is employed, it will be desirable to operate the quadrature clock generator 504 and tune the bandpass filter 510 at a frequency that is significantly different than 36-38 kHz or harmonics thereof to avoid interference from stray optical signals. Simple, well-known modifications may optionally be made to detection circuit 500 to implement such a modulation scheme.

As the threshold comparator 512 outputs a logical 'one' or 'zero' based on the received optical signal, this output may be provided as a first input to an 'exclusive or' (XOR) logic gate 514. The second input to XOR gate 514 corresponds to the output of bit sequence generator 506 that is being used to modulate light-emitting element 222. In this manner, XOR 514 outputs an indication of whether bit being received by the light-receiving element 224 matches that transmitted by light-emitting element 222 at a given moment in time. More specifically, XOR gate 514 operates to output a logical 'one' whenever the bit provided to driver 502 is different than the bit received as indicated at the output of threshold comparator 512. The output of XOR gate 514 is provided to the 'set' input 515 of S-R flip-flop 516.

Flip-flop 516 is preferably an edge-triggered type, meaning that it only changes its state upon a rising edge or a falling edge of a pulse applied to its clock input 517. As shown in FIG. 5, this clock input 517 is coupled to the Phase 2 output signal from quadrature clock generator 504. The purpose of using the Phase 2 clock signal to trigger evaluation of the inputs at the S-R flip-flop 516 is to allow for some settling time between the application of a given logical state at the output of bit sequence generator 506 and the acquisition of the optical signal, filtering and threshold comparison accomplished by components 502 through 512. These stages may exhibit some transient characteristics that would otherwise result in an unreliable presentation of the received bit at the output of threshold comparator 512. By the design shown, there is a brief time delay between when a changing output of bit sequence generator 506 is applied to driver 502 and the time that flip-flop 516 evaluates a comparison between the transmitted bit and the received bit. For example, assuming that the clock input of flip-flop 516 is responsive to a negative-going edge, then the time delay between applying a bit to driver 502 and evaluating the corresponding received bit out of threshold comparator 512 would correspond to roughly ¾ of a clock period, as denoted by T-sub-d in the inset timing diagram 550.

An interface 520 may be included that provides communication capabilities for signals to/from detection system 500. For example, interface 520 may be communicatively coupled to a microprocessor or the like (such as sensor CPU 652 introduced below) to provide signals indicating the continuity of light path 301 so that this logical state can be incorporated into the function of an overall system as will be described more detail below. A beam state sensor output 518 may be provided from flip-flop 516 as part of interface 520 to provide a signal indicating whether there have been any instances of optical path interruption since the last time the flip-flop was reset. Another part of interface 520 may be an input 519 through which flip-flop 516 may be reset such as by command of a microprocessor or the like. In this design, it is assumed that a momentary pulse applied to the 'reset' input will force the output 518 to a logical 'zero'. Through interface 520, a processor interfacing with this detector system 500 may briefly assert a reset pulse at input 519 to initialize the flip-flop 516, and then some time later examine the state of output 518 to determine, over the elapsed time interval since the reset signal was applied, whether the light path 301 was ever interrupted in such a manner that would cause the output of threshold comparator 512 to differ from the output of bit sequence generator 506.

System 500 may include an ambient light detection system to account for the possibility of a bright light overwhelming the light-receiving element 224, which would also have the effect of creating a mismatch between transmitted and received signals. A DC bias circuit 530 is shown to control current to light-receiving element 224, which may be a phototransistor. Over a reasonable range of ambient light conditions, the DC bias circuit 530 strives to maintain a DC voltage level at some nominal level—for example, halfway between circuit ground level (0 V) and the supply voltage for the circuitry. (The response of bias circuit 530 is preferably very slow compared to the clock rate of modulation applied to the optical signal). Under very bright ambient light circumstances, the light levels reaching the light-receiving element 224 may saturate the receiver and in effect "wash out" the modulated signal being emitted by light-emitting element 222. Of course, this condition would cause a mismatch to be detected by XOR gate 514 and, absent other measures, would be interpreted as the same as optical path 301 being interrupted.

This undesirable condition may be appropriately handled by the addition of a comparator 532 to compare the DC level to a reference voltage at input 533. The output of comparator 532 indicates whether the light levels into the light-receiving element have exceeded a preset level, rendering the determination out of XOR 514 unreliable. The output of comparator 532 may be coupled to the 'set' input 543 of a latch circuit 540. Latch circuit 540 is preferably a simple bi-stable multivibrator wherein the output state simply tracks whichever input last received a pulse. (As is well-known, a pair of cross-connected NAND gates may implement a latch of this type). Sensor reset input 519 is shown to be coupled to the 'reset' input 542 of latch 540 such that the same signal that resets flip-flop 516 also simultaneously forces the output of latch 540 to a 'zero' logic state. Latch 540 will remain in this state until the output of comparator 532 feeds a 'high' or logical 'one' state to the other input-namely the 'set' input 543—of latch 540. After a reset pulse has been momentarily applied at input 519 and while flip-flop 516 is monitoring for mismatches, the glare disqualifying circuitry just described is gauging whether an ambient light interference event ever occurs that would account for mismatches detected by XOR 514.

The output of latch 540 is preferably used as a glare disqualifier output signal 534 that is also made available to other external elements through interface 520. Comparator 532 may operate similarly to a well-known LM339 voltage comparator (available from Texas Instruments and others) and its output may represent, for example with a logical 'one', that the light-receiving element 224 is receiving too much light in order to reliably detect the output of light-emitting element 222. Accordingly, a microprocessor or the like interfacing to system 500 through interface 520 may not only interact with reset input 519 and flip-flop output 518 to assess the state of optical light path 301 but may also determine whether any such output is reliable in view of output 534.

Embodiments that use multiple pairs of light-emitting elements 222 and light-receiving elements 224 may connect to multiple instances of systems 500 such as described in FIG. 5. In these situations, the outputs of such systems 500 may be input to a single CPU 652, which may be sufficiently powerful to perform detection activities across all such systems 500 (as described below).

Alternative embodiments of system 500 may be implemented to achieve some or all the effects described above. For example, a microcontroller or programmable logic device may be used to implement one or more of the elements of detection system 501. Electronic components could be implemented using discreet elements or within a fabricated integrated circuit (such as an ASIC).

Figure 6:
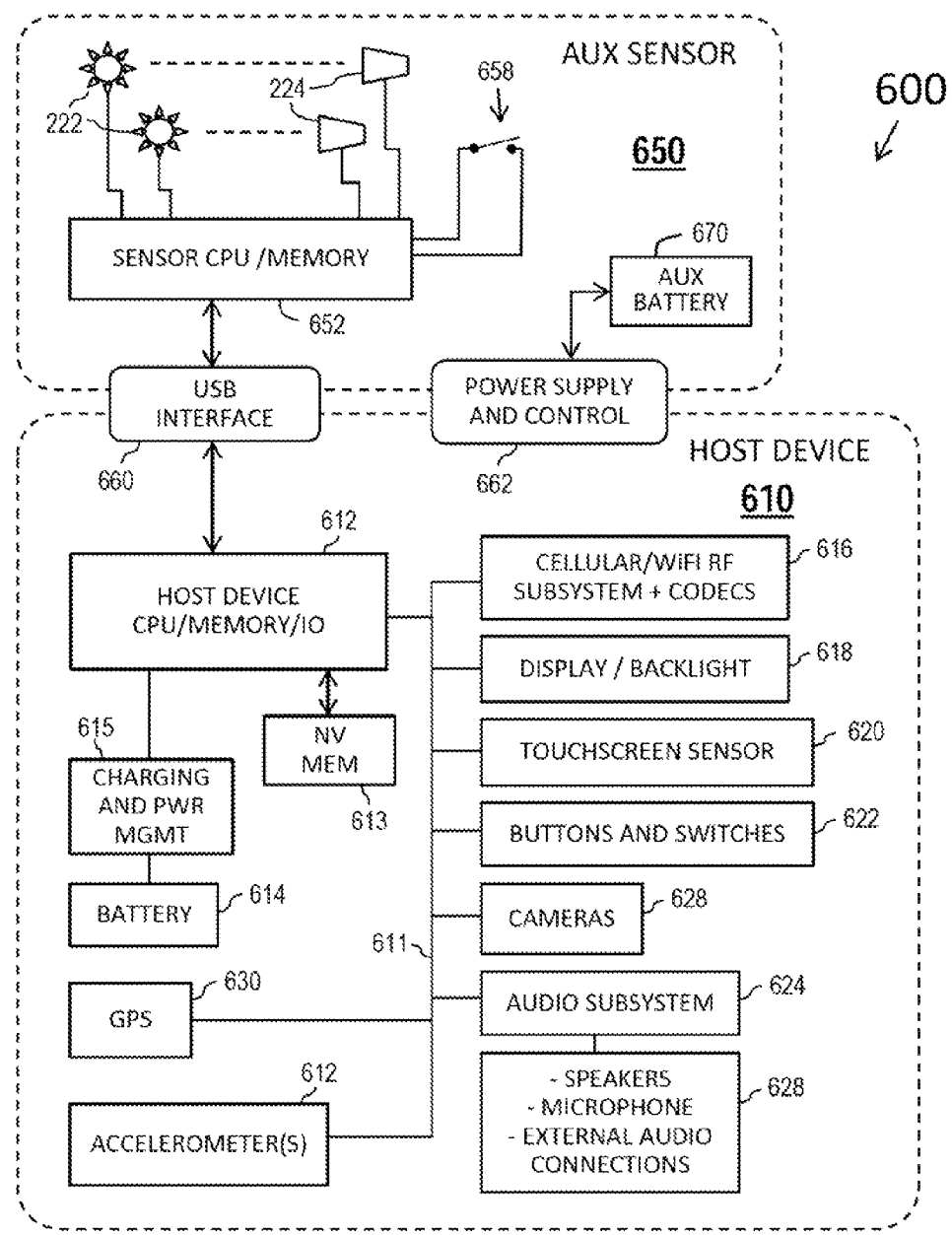
FIG. 6 is a block diagram depicting typical hardware elements for both a host device and an external sensing device communicably coupled thereto in accordance with principles described herein.

FIG. 6 provides a block diagram of the typical hardware elements within both a host device 610 (such as an iPhone) and an auxiliary sensor device 650 in accordance with principles described herein. Host device 610 is shown to comprise a central processing unit as well as the associated memory and input/output circuitry supporting the CPU. These are shown collectively as "host CPU" 612. Host device CPU 612 is also shown to be coupled to a non-volatile data storage 613 which may be used for storing the resident operating system, applications or other executable software along with user data even when no power is supplied from battery 614.

In the case where host device 610 is a mobile device, device 610 may include a battery 614, which is typically rechargeable and serves to provide power to all of the other circuits and subsystems shown in host device 610. The application of charging current to battery 614 as well as control of distribution of power from the battery to other components of host device 610 (which is particularly important in small mobile devices) is accomplished by one or more components that make up a charging and power management function 615.

Through its input/output interlaces, CPU 612 interfaces to a variety of other components and subsystems within host device 610. As shown, these typically include: a cellular and/or Wi-Fi RF subsystem along with hardware codecs 616; an LCD display, as well as a backlight for the display, shown collectively as reference 618; a touchscreen sensor 620 for detecting user input overlaying the display and providing for fingertip gestures gestural control of applications which present information through the display; and various buttons and switches (collectively 622) on the exterior of the host device 610, which may include an on-off switch, along with various pushbuttons the control for example volume up/down.

These subsystems also typically include an audio subsystem 624 which comprises D/A and A/D converters, buffers, signal processors, analog amplifiers, and electrical connectors to interface to, for example, external headphones and microphones and the like. The audio components may also couple to internal audio transducers 626, such as speakers and microphones that may be used to support recording or playback of audio media, as well as to support use of host device 610 as a telephone device. Additionally, one or more cameras 628 may be included in the host device for capturing still images and video. A global positioning system (GPS) subsystem 630 may be incorporated by which the host device or applications hosted therein can determine positioning relative to the Earth. Accelerometers 632 may also be included for determining attitude of the host device with respect to the Earth's gravity, as well as to detect acceleration events.

This description of host device 610 is exemplary. Other host devices 610 may include other components in addition those described above, and may in some cases omit some of the components described above.

Turning now to auxiliary sensor system 650, it is seen that this auxiliary sensor system comprises its own sensor CPU 652 (which may be embedded within the thickened bezel portion of lower housing 220 alongside connector 226 as shown in FIG. 2B). Sensor CPU 652 may be, for example, a PIC Microcontroller™ from Microchip Technology Inc. and may have a small amount of internal non-volatile flash memory for storing executable instructions. Sensor CPU 652 is shown to interface to a detection system 500 (as was shown in FIG. 5) through interface 520.

By way of example, system 500 is shown to couple to just one pair of light emitting elements 222 and light-receiving elements 224. However, as was indicated in FIG. 3A, it is possible for there to be several pairs of such elements incorporated into a single auxiliary sensor housing of the type described herein. Multiple pairs of light-receiving elements may be accommodated in several different ways. An alternative design of a system 500 could simultaneously support several emitter-detector pairs while sharing a common quadrature clock generator 504 and bit sequence generator 506. Even more components might be shared to support multiple emitters and receivers with suitable well-known multiplexing elements such as analog switches to switch out different receive elements while using the same components such as receive amplifier 508, bandpass filter 510 and threshold comparator 512.

Sensor CPU 652 may interact with one or more systems 500 to reset one or more flip-flops 516, to evaluate the outputs of said flip-flops, and to also consider glare disqualifier outputs from other parts of system 500 as was described in conjunction with FIG. 5. As will be described below, sensor CPU 652 determines whether one or more light paths that are part of auxiliary sensor system 650 are interrupted in such a way that they represent intentional user input and communicates this information through a USB interface 660 between the auxiliary sensor system 650 and the host device 610. This USB interface is preferably the USB interface that is already supplied with, for example, the Apple iPhone through its connector 128. That is, in accordance with one illustrative embodiment, auxiliary sensor system 650 comprises connector 226 that mates with connector 128 and accomplishes the USB connection between sensor CPU 652 and host device CPU 612. The communications interface may take other forms, depending on the capabilities of the host device 610.

Additionally power for auxiliary sensor system 650 may be obtained from the host device 610 and its battery 614 through the power supply and control interface 662. Alternatively, however, an implementation of auxiliary sensor system 650 may also serve as an auxiliary battery pack for supplying power to host device 610. Accordingly, FIG. 6 shows an optional auxiliary battery coupled to the power supply and control interface 662 by which a battery disposed in housing 200 may serve to provide auxiliary power and prolong the usable on time of host device 610 in addition to providing the auxiliary sensory capability provided by one or more systems 500.

FIG. 6 also shows an electrical switch 658 that may be included as part of auxiliary sensor 650 and disposed on the surface of housing 200 where a user may actuate it. Electrical switch 658 may provide another input modality in similar fashion to optical light-emitting and light-receiving components already shown.

Figure 7:
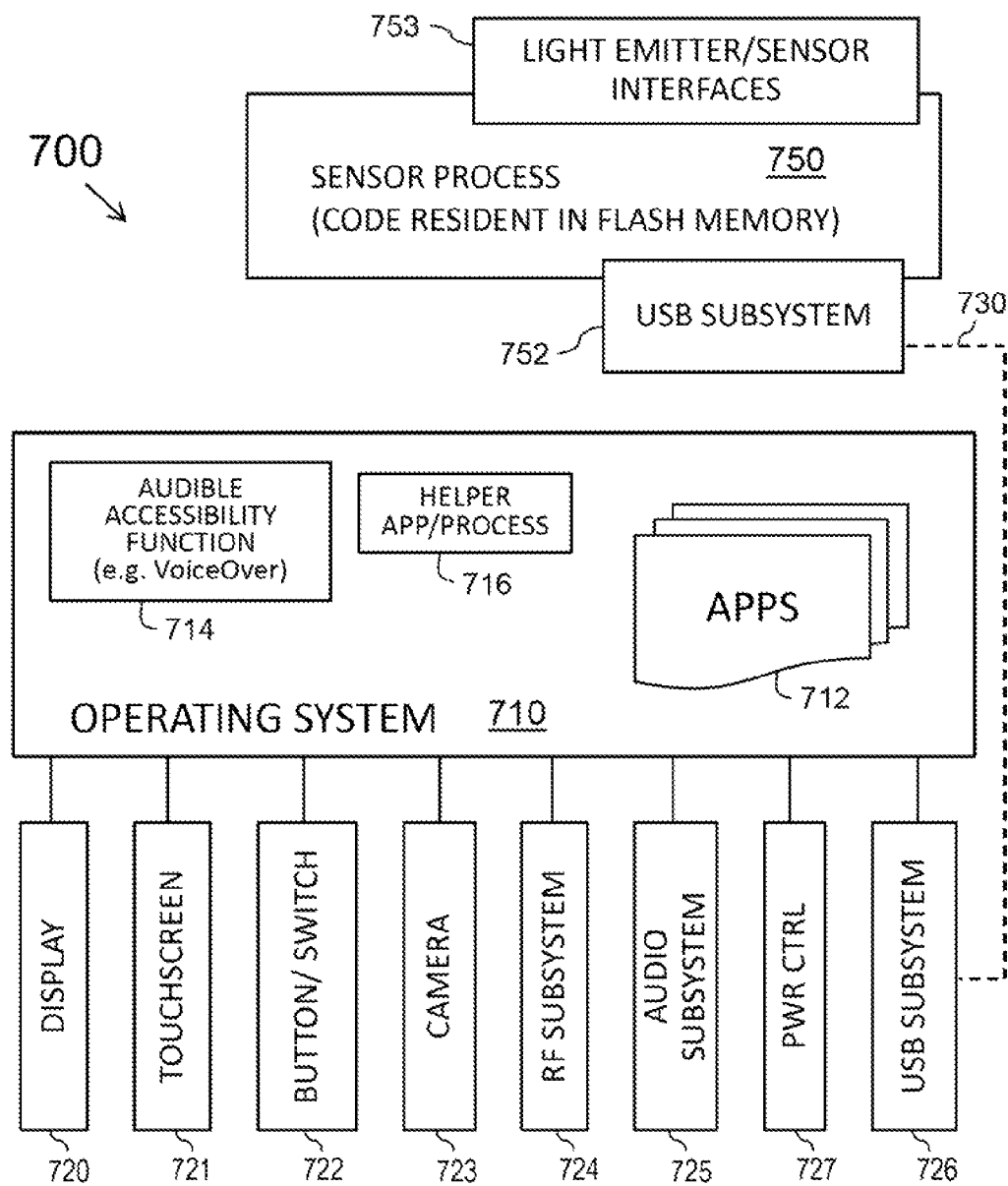
FIG. 7 is a block diagram depicting the interworking of various software elements resident in the host device and an external sensing device in accordance with principles described herein.

FIG. 7 provides a block diagram 700 depicting further system components that may be implemented, for example, as software instructions that are stored and configured to execute within exemplary host device 610 and auxiliary sensor system 650. In the bottom portion of diagram 700, the host device is seen to execute an operating system 710 which in turn manages a number of applications 712. It further includes a number of interface subsystems 520-526 to interface with various hardware elements of the host device 410, such as the display, touchscreen, buttons/switches, etc., as further described below.

One application of particular note is the audible accessibility function 514, an example of which is the well-known accessibility feature called 'VoiceOver' used in the Apple iPhone. As mentioned above, this functionality is aimed at providing blind or low-vision users with audible readout describing elements that are on the display screen of the host device and allows them to locate and interact with some of these display elements. This functionality may also be helpful to users with certain types of cognitive impairments.

In addition to the operating system that supports the general functionality of the device and oversees the instantiation and execution of applications, the host device is seen to comprise a number of more specialized "lower level" subsystems which may be likened to device drivers commonplace in personal computers. These may also represent processes running in other subsystems that work cooperatively with the main host CPU. Where applicable, these blocks are also intended to represent low level "libraries" or APIs that may be invoked by applications provide access to the capabilities of the hardware. These low level subsystems depicted in FIG. 7 include a display subsystem 720, a touchscreen subsystem 721, a button/switch interface subsystem 722, a camera subsystem 723, an RF interface subsystem 724, an audio interface subsystem 725, a USB interface subsystem 726, and a power control interface subsystem 727.

In the top portion of FIG. 7, system components are shown that may be implemented, for example, by software instructions that may be stored and executed by, for example, the sensor CPU 652 introduced in FIG. 6. Sensor processing component 750 may include software that is configured to facilitate interactions with one or more of the sensory components such as detection system 501, through one or more interfaces 753. Interface(s) 553 may be communicatively connected to interface(s) 520 in detection system(s) 500, and may also include components that convert signals into distinct binary logic states suitable for input to sensor CPU 652. Interface(s) 753 may also include multiplexors or serial buses, such as an I2C bus, for communication between sensor CPU 652 and components of detection systems 500. As described further below, sensor processing component 750 interprets any notable events gleaned from the sensors and transmits signaling using the USB subsystem 752 over connection 730 to be available for use by host system 610, and in particular by an audible accessibility application 714 or other application 712 on host system 610.

Figure 8:
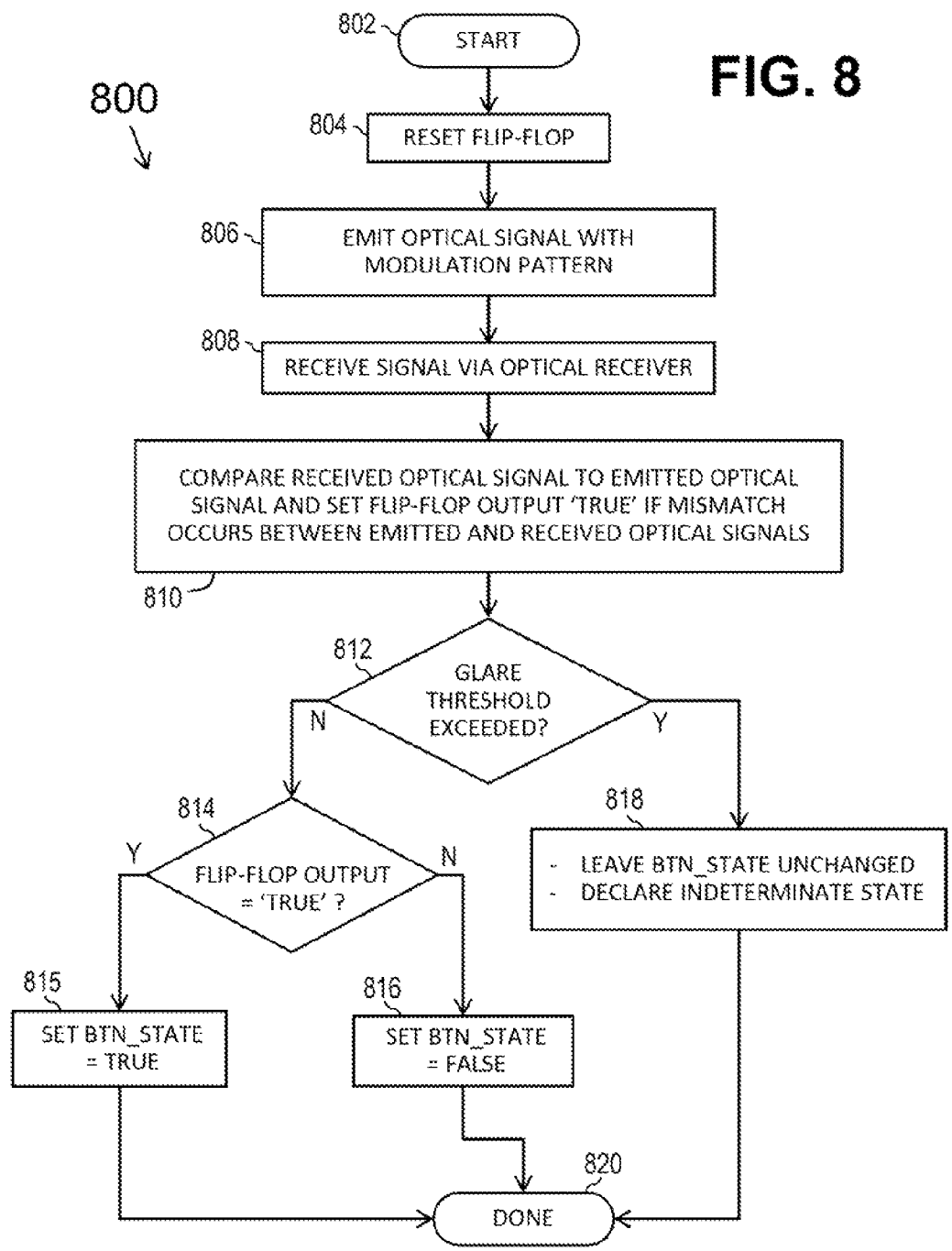
FIG. 8 is a flowchart describing an example process, in accordance with principles described herein, for applying signals to a light-emitting element and interpreting signals from a light-receiving element in order to determine whether a user is acting upon the external sensing device.

FIG. 8 is a flowchart 800 of a manner in which a sensor processing component 750 may work in conjunction with detection system 500 to evaluate the current state of an 'auxiliary, button', referring to a virtual button formed at a region 310 or 311.

Process 800 commences with step 802 in response to a need to take a reading from the sensor, meaning to determine whether the state of an optical path 301 or the like corresponds to an intentional button pressing action by the user. Execution proceeds to step 804 wherein the flip-flop 516 (along with latch 540) depicted in FIG. 5 of the system 500 is initially reset by applying a brief pulse to the reset input 519. Next, in step 806, an optical signal is emitted from light-emitting element 222 that is modulated with a particular on-off pattern as established by bit sequence generator 506. As this modulated optical signal is being emitted, step 808 is undertaken to receive the signal from an optical light-receiving element 224 and process the resulting electrical signal through components such as receive amplifier 508, bandpass filter 510 and threshold comparator 512 as were shown earlier.

In step 810, a comparison is performed between the pattern of modulation applied to the light-emitting element 222 and the on-off pattern of light observed at the light-receiving element 224. As described earlier, this comparison is essentially performed by a XOR gate 514. Step 810 also corresponds to causing the 'Q' output of flip-flop 516 to be set to a logical 'true' state if any instances of mismatch occur between the transmitted optical signal and the received optical signal. The duration for which this comparison is observed is determined by a process, such as sensor process 750 executing within sensor CPU 652. The observation duration will be the time delay between resetting the flip-flop as in step 804 and then subsequently testing the output 518 of flip-flop 516.

Depending upon how the sensor processing component 750 is implemented, output 518 of flip-flop 516 may be tested numerous times following a single reset event or may be tested arbitrarily often according to the design needs of the system. In any case, execution proceeds beyond step 810 when the optical path has been observed for a time or, depending on design, immediately when a mismatch is detected or glare threshold exceeded. Sensor processing component 750 may also be implemented to detect noteworthy changes in the conditions sensed by the sensor circuitry and to initiate messaging to the host device only upon the occurrence of significant changes in state. As can be seen in the example logic flow in process 800, sensor processing component 750 may provide for qualifying or validating the output of the optical path sensing circuitry by the action of step 812.

Step 812 corresponds to sensor processing component 750 determining the state of output 534 from the detection circuit 500, that is, verifying that the light-receiving element 224 is not overwhelmed by ambient light in such a manner that interferes with its ability to gauge the integrity of the optical path 30. If, in step 812, it is determined that the glare threshold was exceeded during the observation of optical path, as indicated by an affirmative indication at output 534, then execution proceeds to step 920 wherein an invalid reading is declared and the process concludes in step 922. Returning to step 912, if it is determined that the light-receiving element was not overly saturated and should have been able to reliably observe the modulated optical signal from light-emitting element 222, then the comparison accomplished in step 810 is deemed valid and execution proceeds to step 814 where, depending on the output 518 from flip-flop 516, the button state is represented as either being true in step 815 or as being false as in step 816. The button state having been measured by system 500 and reported, process 800 then concludes in step 820.

FIG. 9 is a flowchart of a simple generic process by which a host device, working in collaboration with an auxiliary sensor device, may obtain the state of an auxiliary sensor or 'virtual button' and apply this state to enriching functionality within the host device by processing auxiliary user input concurrent with the typical use of the device through the touchscreen interface. Process 900 commences in step 902 which may correspond to, for example, initialization of the device through power on, initial startup of the operating system 710 or initial startup of applications 712 or VoiceOver functionality 714. (FIG. 9 provides a general indication of how to employ the externally sensed input but is not intended to be limiting in terms of the variety of practical uses for the input).

A variable called Prev_Aux_Btn_State is initialized in step 904 and is subsequently used for detecting when a notable change in state of a virtual button has occurred. Execution then proceeds to step 906 wherein an external button state is determined. Step 906 corresponds to process 800 or an equivalent process for obtaining a reading. The result of checking a button current state in step 906 is preferably a Boolean result that is either a 'true' or 'false' or a logical one or 'zero'.

Execution then proceeds to step 908 to take into consideration whether a high ambient light or 'glare' situation may have interfered with measurements during step 906. This information was made available to the sensor process 750 from the sensor output 534 and then communicated to the host device via step 818 described earlier. If the reading was found invalid due to glare condition in step 908, then execution proceeds to step 909 wherein an optional sound effect may be generated by device 100 so that the user is aware of the glare interference and will better understand if the auxiliary touch interaction is momentarily unresponsive. After step 909, then process 900 loops back to step 906 to continue to monitor the auxiliary sensor state.

Returning to step 908, if there has been no glare interference, then execution continues with step 910 wherein to determine whether the current state extracted in step 906 represents a change in state compared to the last time the button state was checked. If in step 910 is determined that the current state is the same as it was during the previous check, then execution simply resumes at state 904 (perhaps after some delay) to again at some time later check the current state of the button. Note that process 900 may be useful to employ when the external sensor circuitry according to the current description needs to interface to an existing host device with minimal changes to the device. Otherwise, the host device could make available I/O interrupts by which changes in sensor output state could be directly signaled to the host CPU.

If, in step 910, it is determined that the current state of the button is different than the immediately previously observed state, then a notable change in button state has occurred and execution proceeds to step 912 to update the Prev_Aux_Btn_State to equal the Current_Aux_Btn_State to enable subsequent detections of state changes. Execution then proceeds to step 914 wherein a determination is made as to whether the current state represents an affirmative pressing of the button by the user. If so, then execution proceeds to step 914 which, in this example process, commences the generation of a sound to indicate to a user that the auxiliary sensor is detecting a button being pressed and that an application operating within the host device may interpret subsequent user input, such as through the touchscreen, in an alternative fashion compared to when the external sensor button is not pressed. Usefulness of this functionality will be explained further below.

Returning to step 914, if it is determined that the current state of the button is 'not pressed', then execution proceeds to step 915 wherein a subtle sound as may have been initiated in step 916 is discontinued. This discontinuation serves to confirm to the user that the virtual button has been released. This notification aspect can be very useful in an implementation in which the virtual button state affects the interpretation of touchscreen input gestures. Upon executing either step 915 or step 916, execution returns to step 906 to again reassess the button state. Process 900 may continue to loop for a duration related one or more of the following situations: as long as power is applied to the host device, power remains applied to the auxiliary sensor device, the operating system remains running, the VoiceOver functionality 714 remains active, or any one of the hosted applications is running.

FIG. 10 provides a flowchart describing an example process in which an application 712 hosted within the host device's operating system 710 might employ input from a sensor as determined by the action of processes 800 and 900 just described. Process 1000 commences in step 1002 when, in the course of generically processing user input through the touchscreen of the host device, the normal user input event messages are being handled by the operating system and various applications and, in particular, when a single point touch event is detected by the touchscreen. An example would be when the user's fingertip makes contact with the touchscreen to either actuate a displayed user interface element on the display or, in the case of a blind or vision impaired user, the user intends to explore the displayed interface elements and locate an element that they wish to act upon.

Step 1004 refers to the detection of a specific single-point touch event which is represented in the software environment of the host operating system by the instantiation of a message or a software object representing the event and its attributes. Next, in step 1006, the condition of one or more button states as provided by an auxiliary sensing device is assessed. Note that step 1006 may be implemented by sensing within the host device the presence of an attached auxiliary sensing device and ensuring that user interface events are routed through a processing software entity such as helper application 716. Helper application 716 may receive user events and convert them whenever the helper process has first been installed in the host device as part of adding the auxiliary sensor system and then has been subsequently invoked by the user who desires to employ the auxiliary sensing input to affect how user input through the host device's touchscreen is interpreted.

Step 1006 may correspond to initiating a measurement of button state for a brief period of time in accordance with process 900. Alternatively, step 1006 may correspond to in software simply checking the value of a software variable called 'Btn_State' as may have already been set by a separate process thread that constantly executes process 800 independent of whether one or more applications such as helper application 716 is needing the state information at any point in time. Regardless of how the button state is obtained in step 1006 execution proceeds to step 1008 which effectively differentiates based on the button state to accomplish two separate modes of operation. In example process 1000, the determination made at step 1008 determines whether a user's pressing of the external button (that is, the interruption of the optical path by one's thumb or finger)

causes subsequent touchscreen input to either function in a purely exploratory mode represented by step 1012 or to be interpreted in the normal sense, in step 1010, as if the VoiceOver application or similar audible accessibility function 714 were not active.

To be clear, process 1000 may execute in a situation where VoiceOver is being used, but process 1000 relieves the user of having to perform double-tap motions to activate an element that is already been selected by operation of the VoiceOver function. In the normal use of the VoiceOver function, the user performs a preparatory selection of an element and the VoiceOver function highlights a particular element that was last touched by the user and maintains a cursor in the position of that element. Once that element has been selected, the VoiceOver function leaves the host device in a mode wherein a subsequent double-tap gesture on the touchscreen will actuate the element in the same manner that a single-tap from a sighted user would have actuated the element without VoiceOver being active. Process 1000 employs an externally sensed virtual button to allow the user to have the host device automatically convert a single-tap into a double-tap so that the VoiceOver functionality, as it currently operates, maintains its same operation and works to provide audible indications of displayed elements without requiring any change to the VoiceOver function.

As shown in step 1008, process 1000 acts in response to auxiliary sensor state in accordance with a first sense wherein a 'false' condition represents a desire to perform a conversion in step 1010. This conversion changes single-tap gestures to a "single-tap then double-tap" to mimic the action of selection then activation while in a VoiceOver-style mode of operation. Also in accordance with the first sense, a 'true' button condition, as shown in step 1012, represents a desire to merely elicit audio readout without actuating a control, which may amount to leaving a single-tap gesture unaffected. It should be readily appreciated that process 1000 could be operated in a second sense that is the reverse of the first sense. In accordance with the second sense, the end user might be required to press the auxiliary sensor 'virtual button' in order to have subsequent input construed as a selection and double-tap event and must release the button in order to operate in a purely exploratory mode. One or the other of these senses may be advantageous for facilitating use of a host device interchangeably between a sighted person and a vision impaired person with very little need for extensive reconfiguration of the VoiceOver mode between the two users. Regardless of which of these execution paths is used to interpret the touch event that was received in step 1004, the process concludes in step 1014.

Process 1000 demonstrates at least one example use of an auxiliary sensing device as described herein, but should not be taken to limit the range of possibilities for usefully applying input from an auxiliary sensor. For one or more auxiliary touch regions (see example regions 312 and 313 of the surface of host device 100 that are not normally touch sensitive but are usefully rendered so using principles described herein) a user, application developer or operating system developer may choose to associate each auxiliary touch region with a particular action, such as toggling an operational mode, suppressing or modifying sounds from the host device, simulating user input gestures as might otherwise be entered through the touchscreen, or executing "hotkey" or macro functions.

As one example, contact of the user with a first auxiliary touch region 312 may be applied to speed up the rate in which synthesized speech is read. A second auxiliary touch region 313 may serve a complementary role by slowing down the rate at which synthesized speech is read. Normally, a user would have to traverse a menu hierarchy to reach the setting for adjusting the rate of synthesized speech, but auxiliary touch regions may be used to circumvent the usual cumbersome traversal of menus and activation of specific controls, leading to a much more dynamic and immediate control for the benefit of the user. While this action serves as one useful example, it should be kept in mind that a wide variety of actions could potentially be associated with activation of one or more of the auxiliary touch regions.

Other possible functions that can be mapped to one or more auxiliary touch regions include, but are not limited to: turning on and off the auxiliary touch sensor; implementing a repeat that functionality to reiterate most recent selections or activations of controls; simulating touchscreen gestures; placing the device into a mode where certain touchscreen gestures are converted into alternative, simulated touchscreen gestures; changing the manner in which descriptive text is audibly read to a user (such as controlling the order or content of the text readout); activating, deactivating or altering the function of an audible accessibility function such as Apple's VoiceOver: or placing the host device in a mode to where it periodically makes a sound or reiterates a recent textual description so that a visually impaired user may more readily locate or resume use of the device if they have momentarily set it aside.

Some of the actions described or implied in process 1000, such as obtaining descriptive information pertaining to user interface elements and performing text-to-speech conversion, may involve, or already be performed fully or partially by, existing components like the VoiceOver functionality in the iPhone and iPad products marketed by Apple. As depicted for illustrative purposes, process 1000 is intended to show what the host device and auxiliary sensor may collectively accomplish. However, the illustrative description does not specify, nor rely upon, whether (using an iPhone as an example) the VoiceOver functionality itself is modified or makes interfaces available to other executables, whether a helper application 516 intercepts 'messages' and modifies software objects to 'wrapper' the existing VoiceOver functionality, or whether an entirely separate audible accessibility function is overlaid within the host device to enable the level of control characterized in process 1000.

The following co-pending U.S. Patent Applications are filed on even date herewith and are hereby incorporated by reference in their entireties: "Apparatus for Detecting Proximity of Object near a Touchscreen" U.S. Ser. No. 13/836,716, and "Method and Apparatus for Facilitating Use of Touchscreen Devices" U.S. Ser. No. 13/838,603.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a limiting sense.

What is claimed is:
1. An apparatus comprising:
   a housing attachable to a computing device, the computing device having, on a first surface, both a first area implementing a touch-sensitive display and a second area that is not a touch-sensitive display, the first and second areas being present on a single flat surface of the computing device;
a light-emitting element disposed at a first portion of a corner of the housing, the light-emitting element configured to transmit light along a path that is substantially parallel to, and in close proximity with, the first surface of the computing device and which crosses over the second area;
a light-receiving element disposed at a second portion of the corner of the housing, the second portion being perpendicular to the first portion, the light-receiving element configured to detect whether the light transmitted from the light-emitting element has traversed the path, along the flat surface of the computing device;
a detector system coupled to the light-receiving element, the detector system generating an output signal indicating whether or not light from the light-emitting element is detected as received by the light-receiving element, the output signal further being indicative of whether an object has been placed on the second area that does not include the touch-sensitive display, in the path of the light transmitted from the light-emitting element, wherein the light traverses the second area without traversing the first area; and
a communication interface coupled to the computing device to communicate the output signal to the computing device.

2. The apparatus of claim 1, wherein the communication interface comprises an electrical connection between a first connector integrated with the device and a second connector integrated with the housing.

3. The apparatus of claim 1, wherein the communication interface comprises a wireless link.

4. The apparatus of claim 1, wherein the detector system further comprises:
a sequence generator communicatively coupled to the light-emitting element, the sequence generator determining a transmitted pattern of light to be output from the light-emitting element; and
a comparator having a first input coupled to the sequence generator and a second input coupled to receive, from the light-receiving element, a received pattern of light detected as received by the light-receiving element, the comparator configured to compare the received pattern of light to the transmitted pattern of light;
wherein the output signal is based on whether the comparator has determined that the transmitted pattern of light matches the received pattern of light.

5. The apparatus of claim 1, wherein the detector system includes an ambient light detection system, the ambient light detection system producing a signal indicating a status of ambient light interference with the detection as received at the light-receiving element.

6. The apparatus of claim 1, wherein the light is emitted from the light-emitting element to the light-receiving element in a line-of-sight fashion.

7. The apparatus of claim 6, wherein the detector system is configured to generate the output signal, indicating that light from the light-emitting element is not detected as received by the light-receiving element, when the line of sight of the path is interrupted.

8. The apparatus of claim 1, wherein the housing includes a recessed area that conforms to an outer edge of the computing device,
wherein when the housing is attached to the computing device, the housing surrounds the computing device and the computing device fits within the recessed area.

9. The apparatus of claim 1, wherein the communication interface comprises a connector that is integrated in, and protrudes from, an inner surface of the housing, wherein the connector is hidden when the computing device is inserted into the housing.

10. The apparatus of claim 1, wherein the first and second portions of the corner do not include the touch-sensitive display.

11. The apparatus of claim 1, wherein the object, placed on the second area, is a finger of a user of the computing device.

12. The apparatus of claim 1, wherein the housing comprises a top half and a bottom half that each comprise a recess to receive the computing device, wherein the top half and the bottom half slide together until joined to encompass the computing device when the computing device is inserted into the recesses of the top half and the bottom half of the housing.

13. A housing apparatus attachable to a computing device, the computing device having, on a first surface, both a first area implementing a touch-sensitive display and a second area that is not a touch-sensitive display, the first and second areas being present on a single flat surface of the computing device, the housing apparatus comprising:
a light-emitting element disposed at a first portion of a corner of the housing apparatus, the light-emitting element configured to transmit light along a path that is substantially parallel to, and in close proximity with, the first surface of the computing device and which crosses over the second area;
a light-receiving element disposed at a second portion of the corner of the housing apparatus, the second portion being perpendicular to the first portion, the light-receiving element configured to detect whether the light transmitted from the light-emitting element has traversed the path, along the flat surface of the computing device;
a detector system coupled to the light-receiving element, the detector system generating an output signal indicating whether or not light from the light-emitting element is detected as received by the light-receiving element, the output signal further being indicative of whether an object has been placed on the second area that does not include the touch-sensitive display, in the path of the light transmitted from the light-emitting element, wherein the light traverses the second area without traversing the first area; and
a communication interface coupled to the computing device to communicate the output signal to the computing device.

14. The housing apparatus of claim 13, wherein the communication interface comprises an electrical connection between a first connector integrated with the device and a second connector integrated with the housing apparatus.

15. The housing apparatus of claim 13, wherein the detector system further comprises:
a sequence generator communicatively coupled to the light-emitting element, the sequence generator determining a transmitted pattern of light to be output from the light-emitting element; and
a comparator having a first input coupled to the sequence generator and a second input coupled to receive, from the light-receiving element, a received pattern of light detected as received by the light-receiving element, the comparator configured to compare the received pattern of light to the transmitted pattern of light;

wherein the output signal is based on whether the comparator has determined that the transmitted pattern of light matches the received pattern of light.

16. The housing apparatus of claim 13, wherein the detector system includes an ambient light detection system, the ambient light detection system producing a signal indicating a status of ambient light interference with the detection as received at the light-receiving element.

17. The housing apparatus of claim 13, wherein the light is emitted from the light-emitting element to the light-receiving element in a line-of-sight fashion, and wherein the detector system is configured to generate the output signal, indicating that light from the light-emitting element is not detected as received by the light-receiving element, when the line of sight of the path is interrupted.

18. A system, comprising:

a housing that is attachable to a computing device that has, on a first surface:

a first area implementing a touch-sensitive display, and a second area that is not a touch-sensitive display, the first and second areas being present on a single flat surface of the computing device, the housing comprising:

a light-emitting element disposed at a first portion of a corner of the housing, the light-emitting element configured to transmit light along a path that is substantially parallel to, and in close proximity with, the first surface of the computing device and which crosses over the second area;

a light-receiving element disposed at a second portion of the corner of the housing, the second portion being perpendicular to the first portion, the light-receiving element configured to detect whether the light transmitted from the light-emitting element has traversed the path, along the flat surface of the computing device;

a detector system coupled to the light-receiving element, the detector system generating an output signal indicating whether or not light from the light-emitting element is detected as received by the light-receiving element, the output signal further being indicative of whether an object has been placed on the second area that does not include the touch-sensitive display, in the path of the light transmitted from the light-emitting element, wherein the light traverses the second area without traversing the first area; and a communication interface coupled to the computing device to communicate the output signal to the computing device.

19. The system of claim 18, wherein the communication interface comprises an electrical connection between a first connector integrated with the device and a second connector integrated with the housing.

20. The system of claim 18, wherein the detector system further comprises:

a sequence generator communicatively coupled to the light-emitting element and determining a transmitted pattern of light to be output from the light-emitting element; and a comparator having a first input coupled to the sequence generator and a second input coupled to receive, from the light-receiving element, a received pattern of light detected as received by the light-receiving element, the comparator configured to compare the received pattern of light to the transmitted pattern of light;

wherein the output signal is based on whether the comparator has determined that the transmitted pattern of light matches the received pattern of light.

* * * * *